US007433815B2

(12) United States Patent
Jabri et al.

(10) Patent No.: US 7,433,815 B2
(45) Date of Patent: Oct. 7, 2008

(54) METHOD AND APPARATUS FOR VOICE TRANSCODING BETWEEN VARIABLE RATE CODERS

(75) Inventors: Marwan A. Jabri, Broadway (AU); Jianwei Wang, Killarney Heights (AU); Nicola Chong-White, Greenwich (AU)

(73) Assignee: Dilithium Networks Pty Ltd., Petaluma, CA (US)

( * ) Notice: Subject to any disclaimer, the term of this patent is extended or adjusted under 35 U.S.C. 154(b) by 1003 days.

(21) Appl. No.: 10/660,468

(22) Filed: Sep. 10, 2003

(65) Prior Publication Data

US 2005/0053130 A1 Mar. 10, 2005

(51) Int. Cl.
*G10L 19/12* (2006.01)
*G10L 11/00* (2006.01)
*H04J 3/22* (2006.01)

(52) U.S. Cl. ........................ 704/203; 704/206; 704/221; 370/466

(58) Field of Classification Search ................. 704/203, 704/206, 207, 219, 221, 225; 370/466
See application file for complete search history.

(56) References Cited

U.S. PATENT DOCUMENTS 6,438,518 B1 * 8/2002 Manjunath et al. .......... 704/219
6,584,438 B1 * 6/2003 Manjunath et al. .......... 704/228
6,829,579 B2 * 12/2004 Jabri et al. .................. 704/221
6,917,914 B2 * 7/2005 Chamberlain ............... 704/219
7,016,831 B2 * 3/2006 Suzuki et al. ............... 704/203
7,092,875 B2 * 8/2006 Tsuchinaga et al. ......... 704/210
7,133,521 B2 * 11/2006 Jabri et al. .................. 379/386
7,142,559 B2 * 11/2006 Choi et al. .................. 370/466
7,184,953 B2 * 2/2007 Jabri et al. .................. 704/221
7,254,533 B1 * 8/2007 Jabri et al. .................. 704/219
7,260,524 B2 * 8/2007 Jabri et al. .................. 704/223
7,263,481 B2 * 8/2007 Jabri et al. .................. 704/219
7,266,611 B2 * 9/2007 Jabri et al. .................. 709/231
7,307,981 B2 * 12/2007 Choi et al. .................. 370/352
7,363,218 B2 * 4/2008 Jabri et al. .................. 704/221
2002/0123885 A1 * 9/2002 Sluijter et al. ............... 704/201
2003/0115046 A1 * 6/2003 Zinser et al. ................ 704/219
2003/0210659 A1 * 11/2003 Chu et al. .................. 370/320
2004/0153316 A1 * 8/2004 Hardwick ................... 704/214
2004/0158847 A1 8/2004 Omura
2005/0049855 A1 * 3/2005 Chong-White et al. ...... 704/219

OTHER PUBLICATIONS

Office Action dated Nov. 7, 2007 for U.S. Appl. No. 10/642,422.

* cited by examiner

*Primary Examiner*—Martin Lerner
(74) *Attorney, Agent, or Firm*—Townsend and Townsend Crew LLP

(57) ABSTRACT

A variable-rate voice transcoder that transcodes a bitstream representing frames of data encoded according to a first compression standard to a bitstream representing frames of data according to a second compression standard; the second compression standard defines a variable-rate voice codec. The method includes unquantizing a bitstream into a first set of parameters compatible with the first compression standard. The first set of parameters in addition to external control commands are then used to determine a frame class and a rate for the second compression standard. Next, the first set of parameters are transformed into a second set of parameters compatible with the second compression standard according to the frame-classification and rate determination decision. Lastly, the second set of parameters is packed into a bitstream compatible with the second compression standard.

24 Claims, 20 Drawing Sheets

METHOD AND APPARATUS FOR VOICE TRANSCODING BETWEEN VARIABLE RATE CODERS

BACKGROUND OF THE INVENTION

The present invention relates generally to processing of telecommunication signals. More particularly, the present invention relates to a method and apparatus for transcoding a bitstream encoded by a first voice speech coding format into a bitstream encoded by a second variable-rate voice coding format. Merely by way of example, the invention has been applied to variable-rate voice transcoding, but it would be recognized that the invention may also be applicable to other applications.

Telecommunication techniques have progressed through the years. One of the major desires of speech coding development is high quality output speech at a low average data rate. One approach is to employ a variable bit-rate scheme, whereby the transmission rate is not only determined by the network traffic but also from the characteristics of the input speech signal. For example, when the signal is highly voiced, a high bit rate may be chosen; if the signal is weak, a low bit rate is chosen; and if the signal has mostly silence or background noise, a lower bit rate is chosen. This often provides efficient allocation of the available bandwidth, without sacrificing output voice quality. Such variable-rate coders include the TIA IS-127 Enhanced Variable Rate Codec (EVRC), and 3rd generation partnership project 2 (3GPP2) Selectable Mode Vocoder (SMV). These coders use Rate Set 1 of the Code Division Multiple Access (CDMA) communication standards IS-95 and cdma2000, which include rates of 8.55 kbit/s (Rate 1 or full Rate), 4.0 kbit/s (half-rate), 2.0 kbit/s (quarter-rate) and 0.8 kbit/s (eighth rate). SMV selects the bit rate based on the input speech characteristics and operates in one of six network controlled modes, which limit the bit rate during high traffic. Depending on the mode of operation, different thresholds may be set to determine the rate usage percentages.

To accurately decide the desired transmission rate, and obtain high quality output speech at that rate, input speech frames are categorized into various classes. For example, in SMV, these classes include silence, unvoiced, onset, plosive, non-stationary voiced and stationary voiced speech. It is known that certain coding techniques are better suited for certain classes of sounds. Also, some types of sounds, for example, voice onsets or unvoiced-to-voiced transition regions, have higher perceptual significance and thus generally require higher coding accuracy than other classes of sounds, such as unvoiced speech. Thus, the speech frame classification may be used, not only to decide the most efficient transmission rate, but also the best-suited coding algorithm.

Accurate classification of input speech frames is desired to fully exploit the signal redundancies and perceptual importance. Typical frame classification techniques include voice activity detection, measuring the amount of noise in the signal, measuring the level of voicing, detecting speech onsets, and measuring the energy in a number of frequency bands. These measures generally require the calculation of numerous parameters, such as maximum correlation values, line spectral frequencies, and frequency transformations.

While coders such as SMV achieve much better quality at lower average data rate than existing speech codecs at similar bit rates, the frame classification and rate determination algorithms are complex. In the case of a tandem connection of two speech vocoders, however, many of the measurements performed for frame classification have already been calculated in the source codec. This can be capitalized on in a transcoding framework. In transcoding from the bitstream format of one CELP codec to the bitstream format of another CELP codec, rather than fully decoding to PCM and re-encoding the speech signal, smart interpolation methods may be applied directly in the CELP parameter space. Hence the parameters, such as pitch lag, pitch gain, fixed codebook gain, line spectral frequencies and the source codec bit rate are available to the destination codec. This allows frame classification and rate determination of the destination voice codec to be performed in a fast manner.

The simplest method of transcoding is a brute-force approach called tandem transcoding, shown in FIG. 1. This method performs a full decode 110 of the incoming compressed bits to produce synthesized speech 112. The synthesized speech is then encoded 114 for the target standard. This method is undesirable because of the huge amount of computation performed in re-encoding the signal, as well as quality degradations introduced by pre- and post-filtering of the speech waveform, and the potential delays introduced by the look-ahead-requirements of the encoder.

Methods for "smart" transcoding similar to that illustrated in FIG. 2 have appeared in the literature. These methods essentially reconstruct the speech signal and then perform significant work to extract the various CELP parameters such as line spectral frequencies and pitch. That is, these methods still operate in the speech signal space. In particular, the excitation signal which has already been optimally matched to the original speech by the far-end source encoder (encoder that produced the compressed speech according to a compression format) is often only used for the generation of the synthesized speech. The synthesized speech is then used to compute a new optimal excitation. Due to the requirement of incorporating impulse response filtering operations in closed-loop searches of the excitation parameters, this becomes a very computationally intensive operation.

Further, these transcoding methods do not cover the transcoding between variable-rate voice coders which determine the bit rate based on the characteristics of the input speech and, in some cases, external commands. During the transcoding process, the frame classification and rate decision of the destination voice codec in transcoding are still computed through the speech signal domain. The transcoder thus includes the equivalent amount of computational resources as the destination codec to classify frame types and to determine the bit rates. The smart transcoding of previous methods may lose part of their computational advantage, as the classification algorithms require parameters from intermediate stages of functions that have been omitted. For example, recalculation of the line spectral frequencies is often not performed in transcoding, however, the LPC prediction gain, LPC prediction error, autocorrelation function and reflection coefficients are often required in the classification and rate determination process.

From the above, it is seen that improved telecommunication techniques are desired.

BRIEF SUMMARY OF THE INVENTION

According to the present invention, techniques for processing of telecommunication signals are provided. More particularly, the present invention relates to a method and apparatus for transcoding a bitstream encoded by a first voice speech coding format into a bitstream encoded by a second variable-rate voice coding format. Merely by way of example, the invention has been applied to variable-rate voice transcoding, but it would be recognized that the invention may also be applicable to other applications.

According to an aspect of the present invention, there is provided a voice transcoding apparatus comprising:

a first voice compression code parameter unpack module that extracts the input encoded bitstream according to the first voice codec standard into its speech parameters. In the case of CELP-based codecs, these parameters may be line spectral frequencies, pitch lag, adaptive codebook gains, fixed codebook gains, codevectors as well as other parameters;

a frame classification and rate determination module that takes the parameters from the input encoded bitstream and external control commands to generate the destination codec frame type and rate decision;

at least one parameter interpolator and mapping module that converts the input source parameters into destination encoded parameters, taking into account the subframe and/or frame size difference between the source and destination codec.

a destination parameter packer that converts the encoded parameters into output encoded packets;

a first stage switching module that connects the source parameter unpack module to a parameter interpolator and mapping module;

a second stage switching module that connects the destination parameter pack module to a parameter interpolator and mapping module;

a control engine that controls the selection of parameter tuning engine to adapt the available resource and signal processing requirement;

a status reporting module that provides the status of parameter-based transcoding.

Numerous benefits are achieved using the present invention over conventional techniques. These benefits have been listed below:

To perform smart voice transcoding between variable-rate voice codecs;

To classify the destination codec frame type directly from the parameters of input source codec frames;

To determine the rate of the destination codec directly from the parameters of input source codec frames;

To improve voice quality through mapping parameters in the parameter space;

To reduce the computational complexity of the transcoding process;

To reduce the delay through the transcoding process;

To reduce the amount of memory required by the transcoding; and

To provide a generic transcoding architecture that may be adapted to current and future variable-rate codecs.

Depending upon the embodiment, one or more of these benefits may be achieved. These and other benefits are described throughout the present specification and more particularly below.

Other features and advantages of the present invention will be apparent from the following description taken in conjunction with the accompanying drawing, in which like reference characters designate the same or similar parts throughout the figures thereof.

BRIEF DESCRIPTION OF THE DRAWINGS

The objectives, features, and advantages of the present invention, which are believed to be novel, are set forth in detail in the appended claims. The present invention, both as to its organization and manner of operation, together with further objectives and advantages, may best be understood by reference to the following description, in connection with the accompanying drawings.

DETAILED DESCRIPTION OF THE INVENTION

According to the present invention, techniques for processing of telecommunication signals are provided. More particularly, the present invention relates to a method and apparatus for transcoding a bitstream encoded by a first voice speech coding format into a bitstream encoded by a second variable-rate voice coding format. Merely by way of example, the invention has been applied to variable-rate voice transcoding, but it would be recognized that the invention may also be applicable to other applications.

A method and apparatus of the invention are discussed in detail below. In the following description, for purposes of explanation, numerous specific details are set forth in order to provide a thorough understanding of the present invention. The case of SMV and EVRC are used for the purpose of illustration and for examples. The methods described here are generic and apply to the transcoding between any pair of linear prediction-based voice codecs. A person skilled in the relevant art will recognize that other steps, configurations and arrangements can be used without departing from the spirit and scope of the present invention.

Figure 1:
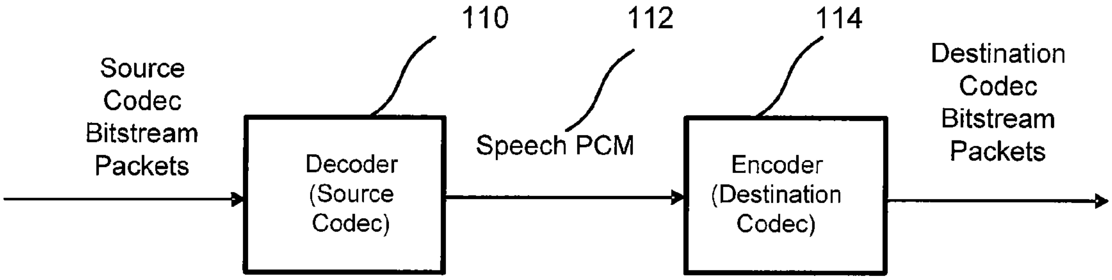
FIG. 1 Prior Art
FIG. 1 is a simplified block diagram illustrating the general tandem coding connection to convert a bitstream from one codec format to another codec format.
Figure 2:
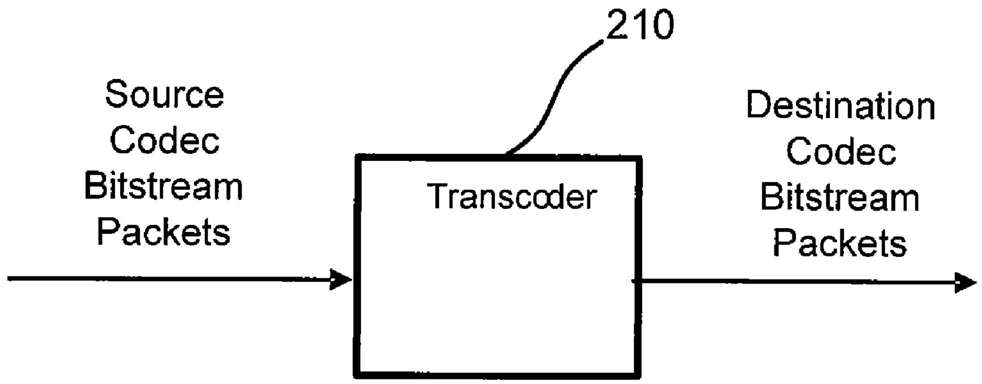
FIG. 2 Prior Art
FIG. 2 is a simplified block diagram illustrating a general transcoder connection to convert a bitstream from one codec format to another codec format without full decode and re-encode.
Figure 3:
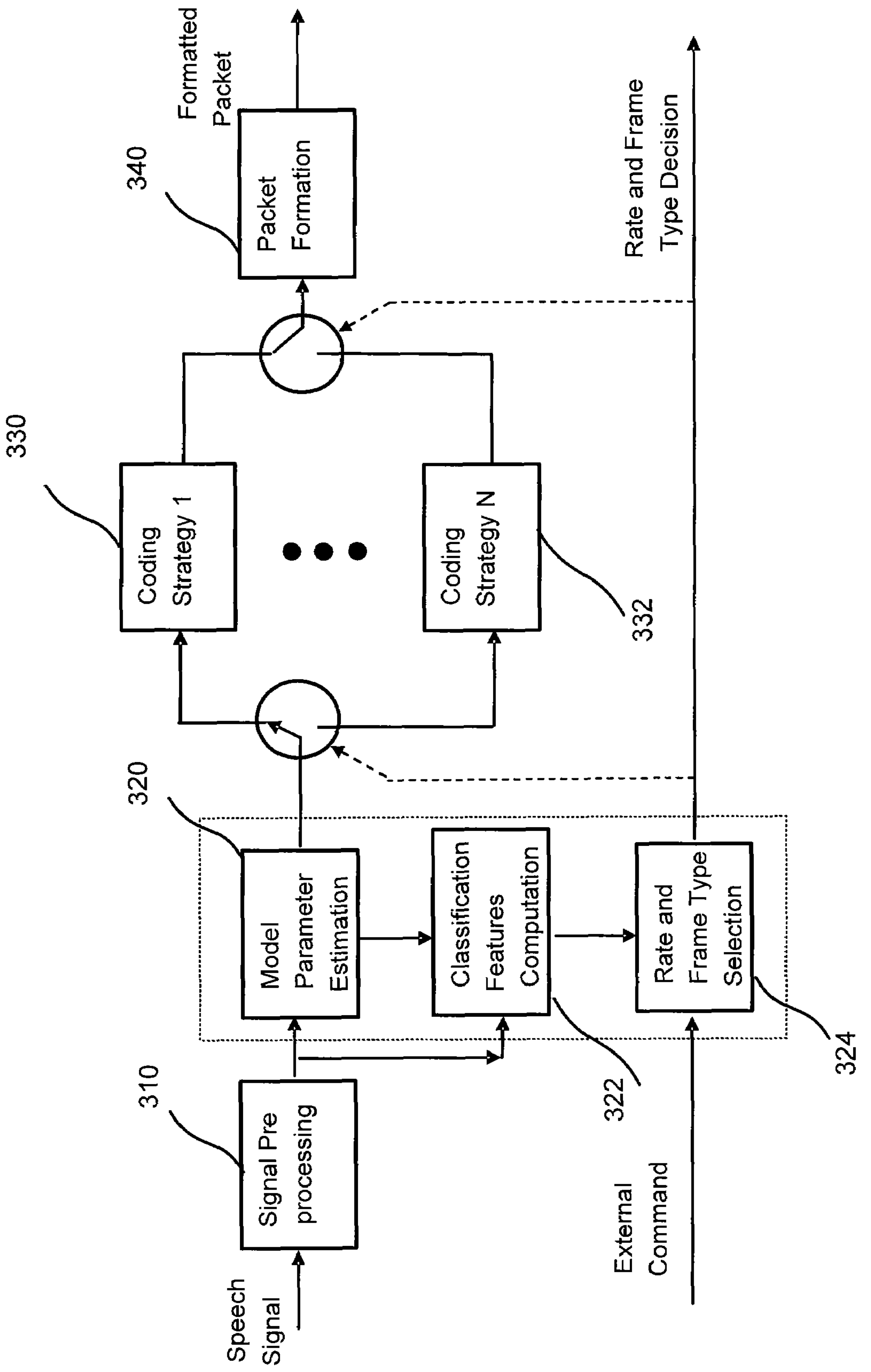
FIG. 3 is a simplified block diagram illustrating the encoding processes performed in a variable-rate voice encoder.

A block diagram of a tandem connection between two voice codecs 110, 114 is shown in FIG. 1. Alternatively a transcoder 210 may be used, as shown in FIG. 2, which converts the bitstream from a source codec to the bitstream of a destination codec without fully decoding the signal to PCM and then re-encoding the signal. The present invention is a transcoder between voice codecs, whereby the destination codec is a variable bit-rate voice codec that determines the bit-rate based on the input speech characteristics. A block diagram of the encoder of a variable bit-rate voice coder is shown in FIG. 3. The input speech signal passes through several processing stages including pre-processing 310, estimation of model parameters 320 and computation of classification features 322. Then, a rate, and in some cases, a frame type, is determined based on the features detected 324. Depending on the rate decision, a different strategy may be used in the encoding process 330, 332. Once coding is complete, the parameters are packed in the bitstream 340.

Figure 4:
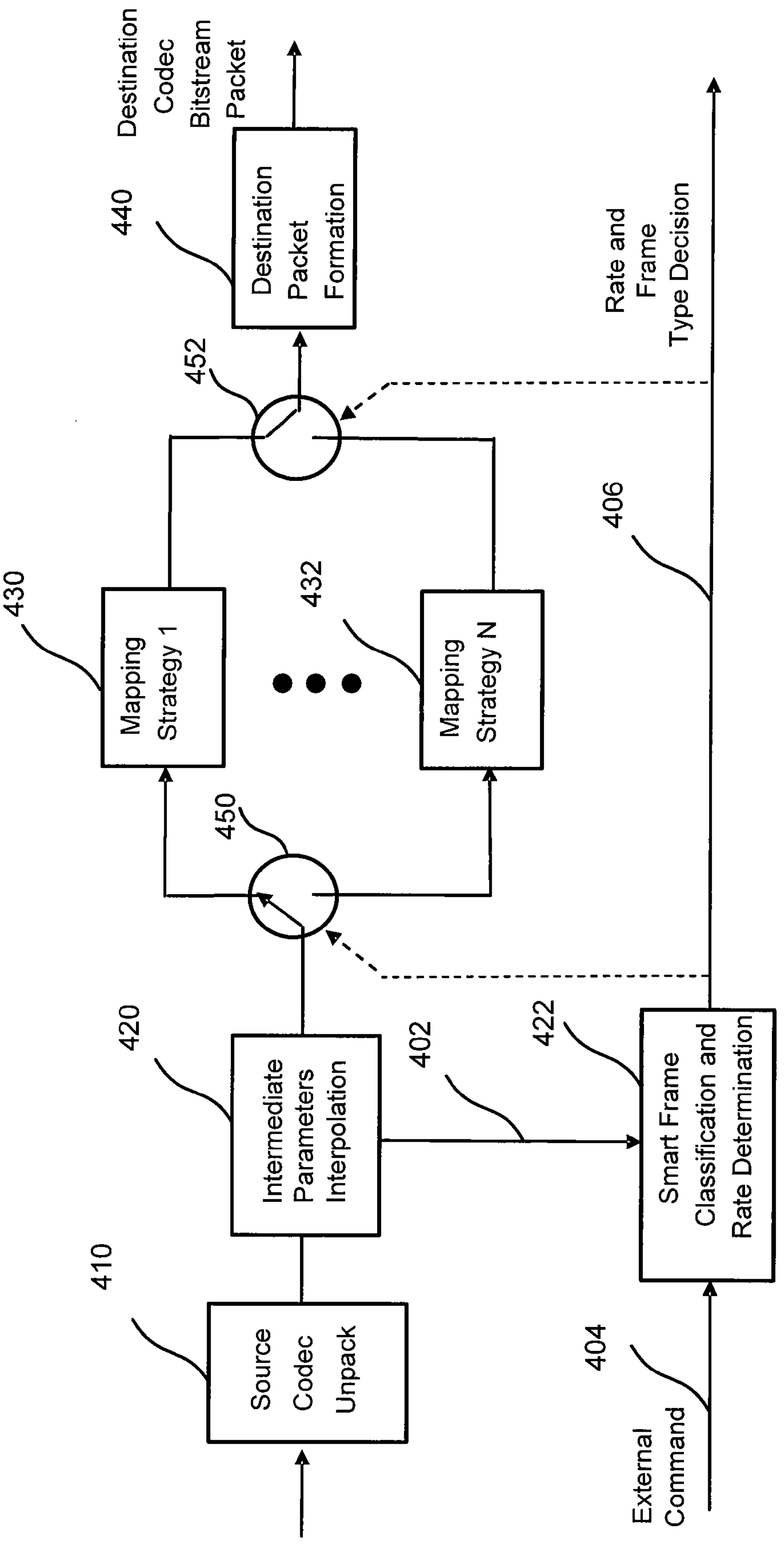
FIG. 4 is a simplified block diagram of the variable-rate voice codec transcoding according to an embodiment of the present invention based on a smart frame classification and rate determination method.
Figure 5:
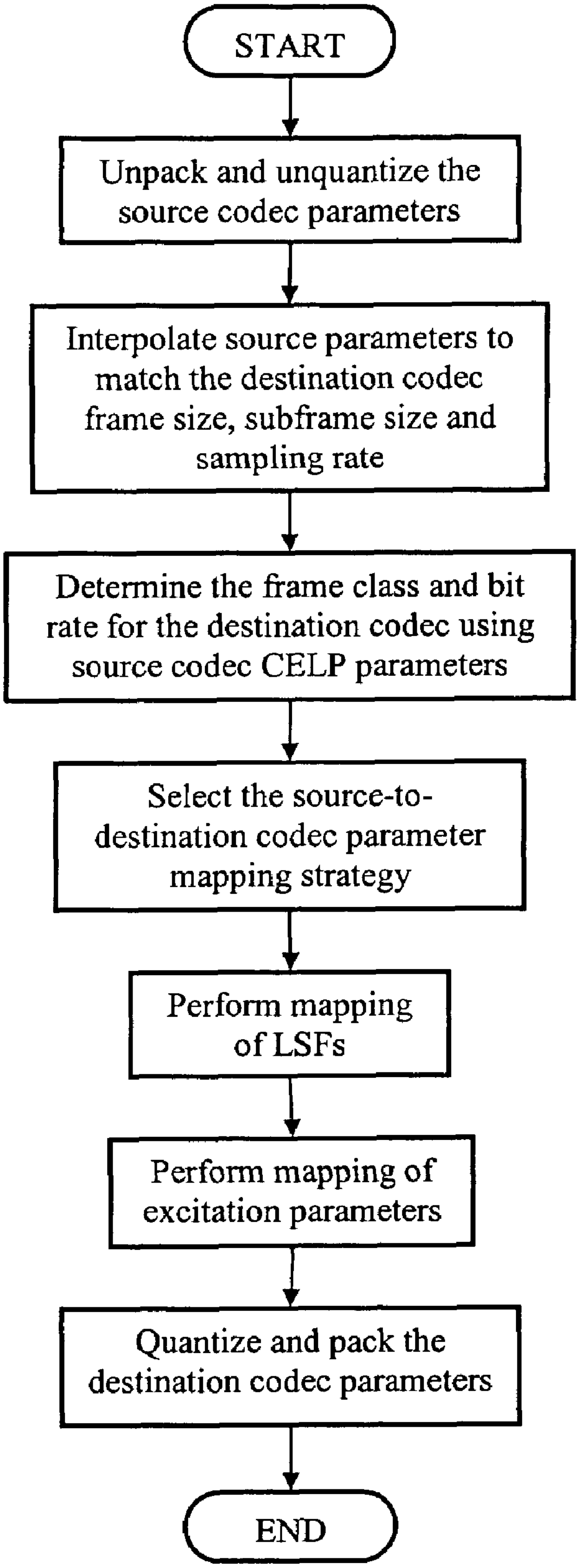
FIG. 5 is a simplified flowchart of the steps performed in the variable-rate voice codec transcoding according to an embodiment of the present invention based on a smart frame classification and rate determination method

A diagram of the apparatus for transcoding between two variable bit-rate voice codecs of the present invention is shown in FIG. 4. The apparatus comprises a source codec unpacking module 410, an intermediate parameters interpolation module 420, a smart frame classification and rate determination module 422, several mapping strategy modules 430, 432, a switching module 450 to select the desired mapping strategy, a destination packet formation module 440, and a second switching module 452 that liniks the mapping strategy to the destination packet formation module 440. The method for transcoding between two variable bit-rate voice codecs is shown in FIG. 5.

Firstly, the bitstream representing frames of data encoded according to the source voice codec is unpacked and unquantized by a bitstream unpacking module 410. The actual parameters extracted from the bitstream depend on the source codec and its bit rate, and may include line spectral frequencies, pitch delays, delta pitch delays, adaptive codebook gains, fixed codebook shapes, fixed codebook gains and frame energy. Particular voice codecs may also transmit information regarding spectral transition, interpolation factors, the switch predictor used as well as other minor parameters. The unquantised parameters are passed to the intermediate parameters interpolation module 420.

The intermediate parameters interpolation module 420 interpolates between different frame sizes, subframe sizes and sampling rates. This is required if there are differences in the frame size or subframe size of the source and destination codecs, in which case the transmission frequency of parameters may not be matched. Also, a difference in the sampling rate between the source codec and destination codec requires modification of parameters. The output interpolated parameters 402 are passed to the smart frame classification and rate determination module and one of the mapping modules 422.

Figure 6:
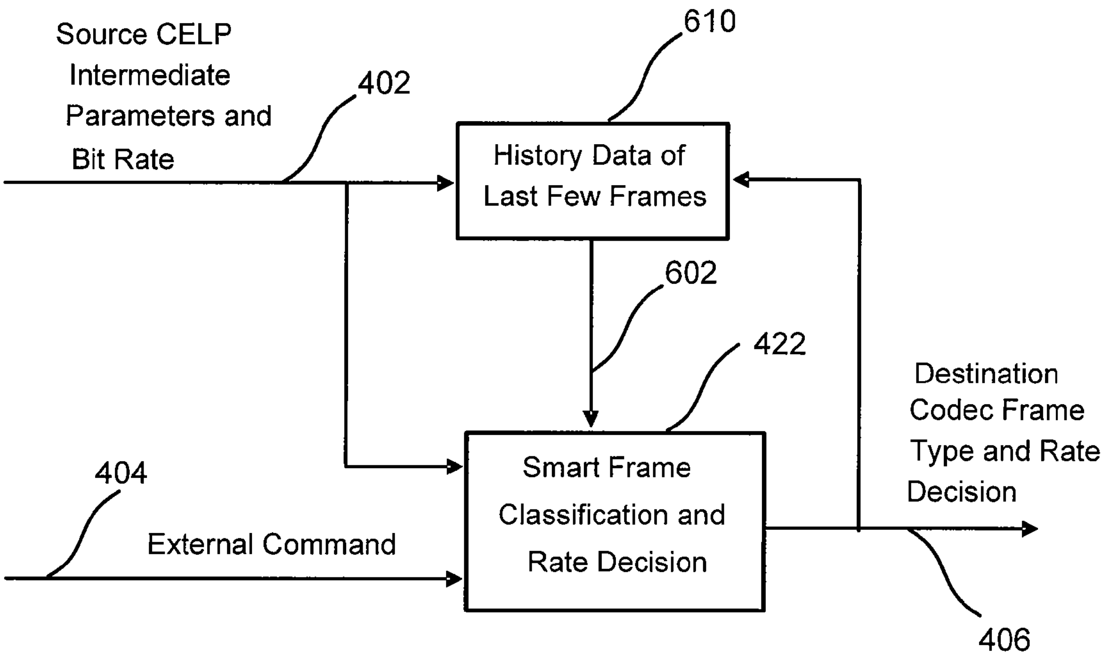
FIG. 6 is a simplified diagram of a smart frame classification and rate determination classifier according to an embodiment of the present invention.
Figure 7:
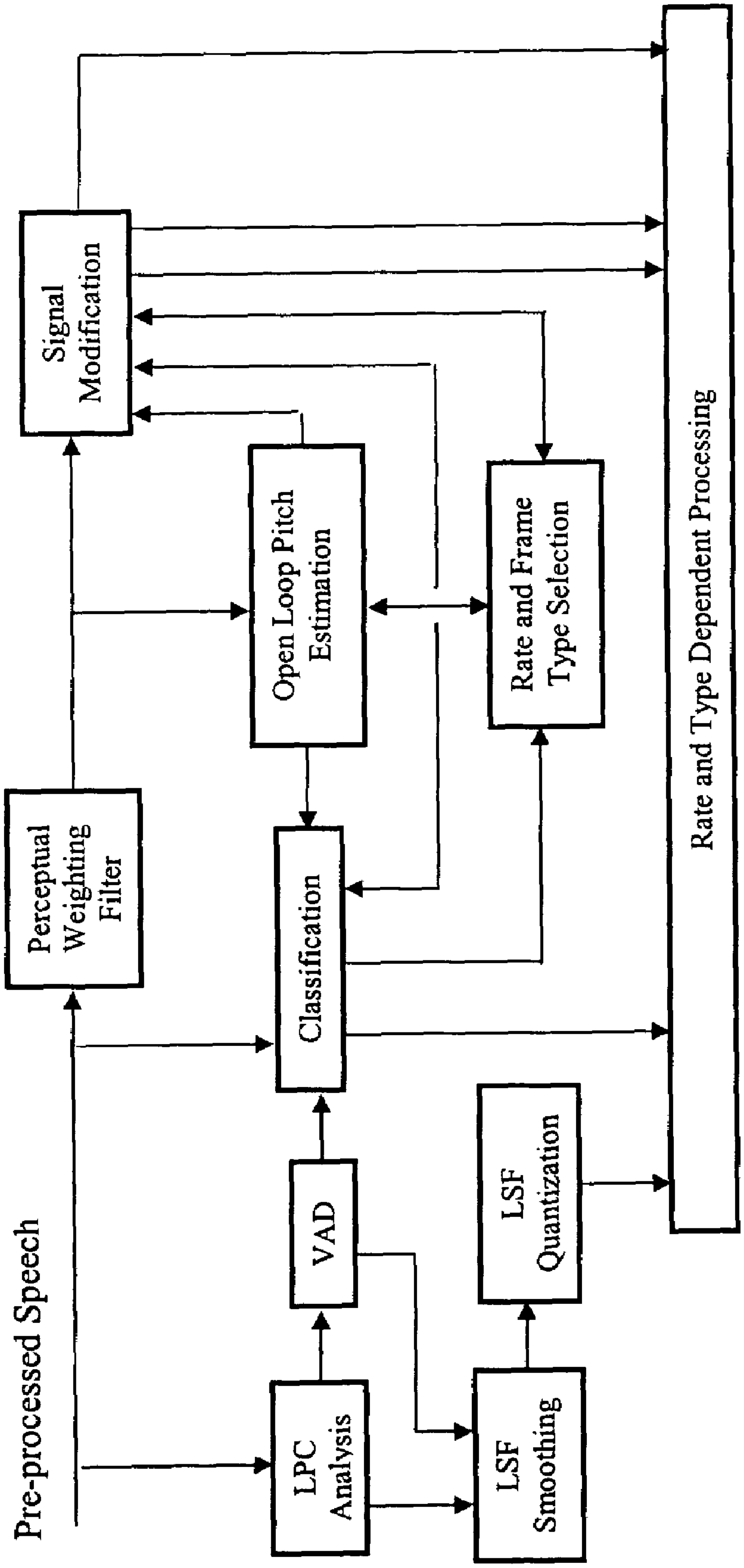
FIG. 7 is a simplified block diagram illustrating the frame classification and rate determination in a variable-rate encoder according to an embodiment of the present invention.
Figure 8:
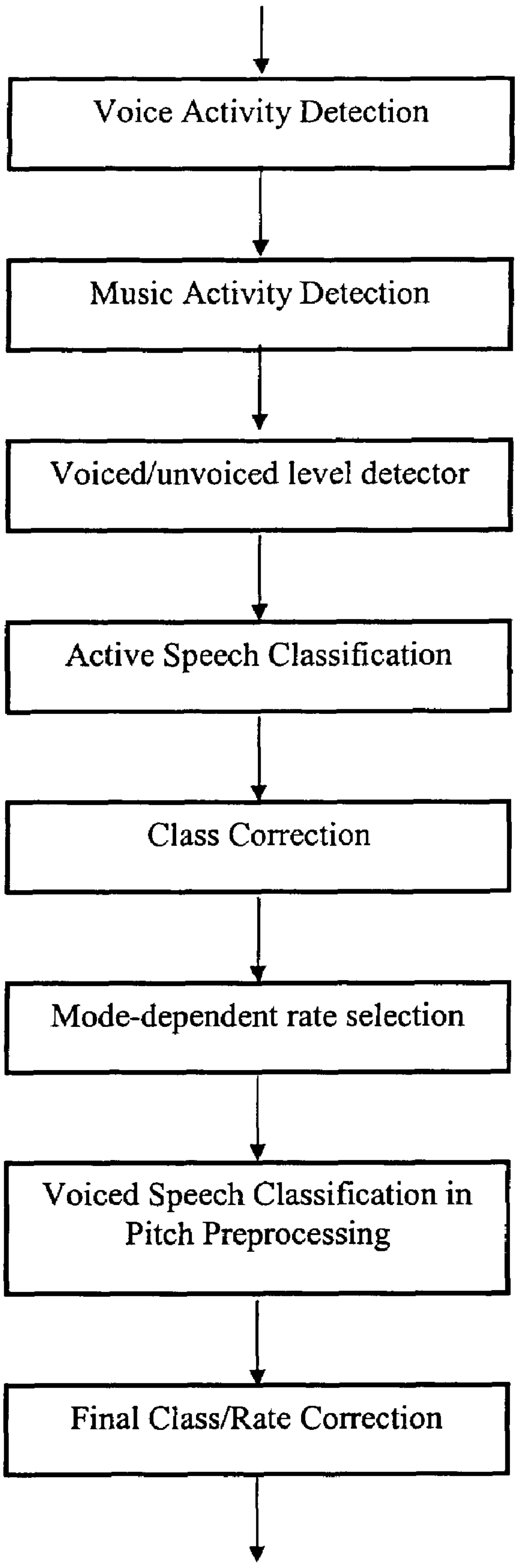
FIG. 8 illustrates the various stages of frame classification in a variable-rate voice encoder according to an embodiment of the present invention.

The frame classification and rate determination module 422 receives the unquantized interpolated parameters of the source codec 402 and the external control commands of the destination codec 404, as shown in FIG. 6. The frame classification and rate determination module 422 comprises a classifier input parameter selector, for selecting which inputs will be used in the classification task, M sub-classifiers, buffers to store past input parameters and past output values, and a final decision module. The classifier takes as input the selected classification input parameters 402, external commands 404, and past input and output values 602, and generates as output the frame class and rate decision 406 for the destination codec. Once classification has been performed, the states of the data buffers storing past parameter values are updated 610. The output rate and frame type decision 406 controls the first switching module 450 that selects the parameter mapping module, and the second switching module 452 that links the parameter mapping module to the bitstream packing module 440. Frame classification is performed according to predefined coefficients or rules determined during a prior training or classifier construction process. Several types of classification techniques may be used, including but not exclusive to, decision trees, rule-based models, and artificial neural networks. The functions for computing classification features and the many steps of the classification procedure for a particular codec are shown in FIG. 7 and FIG. 8 respectively. In an embodiment of the present invention, the frame classification and rate determination module replaces the standard classifier of the destination codec, as well as the processing functions of the destination codec required to generate the classification parameters.

The intermediate parameters interpolation module 420 and the frame classification and rate determination module 422 are linked to one of many parameter mapping modules 430, 432 by a switching module 450. The destination codec frame type and bit rate determined 406 by the frame classification and rate determination module 422 control which mapping module is to be chosen 422. Mapping modules 430, 432 may exist for each combination of bit-rate and frame class of the source codec to each bit rate and frame class of the destination codec.

Figure 9:
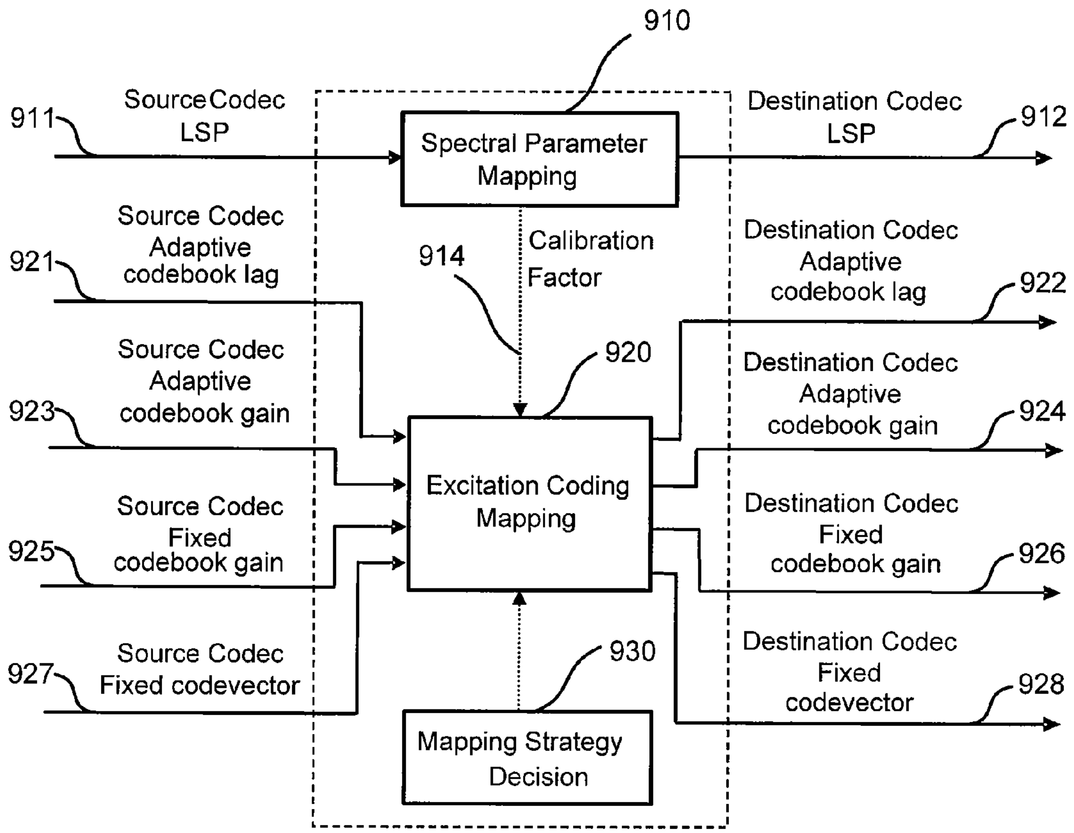
FIG. 9 is a simplified block diagram illustrating a first set of CELP parameters for an active frame being transformed to a second set of CELP parameters according to an embodiment of the present invention.
Figure 10:
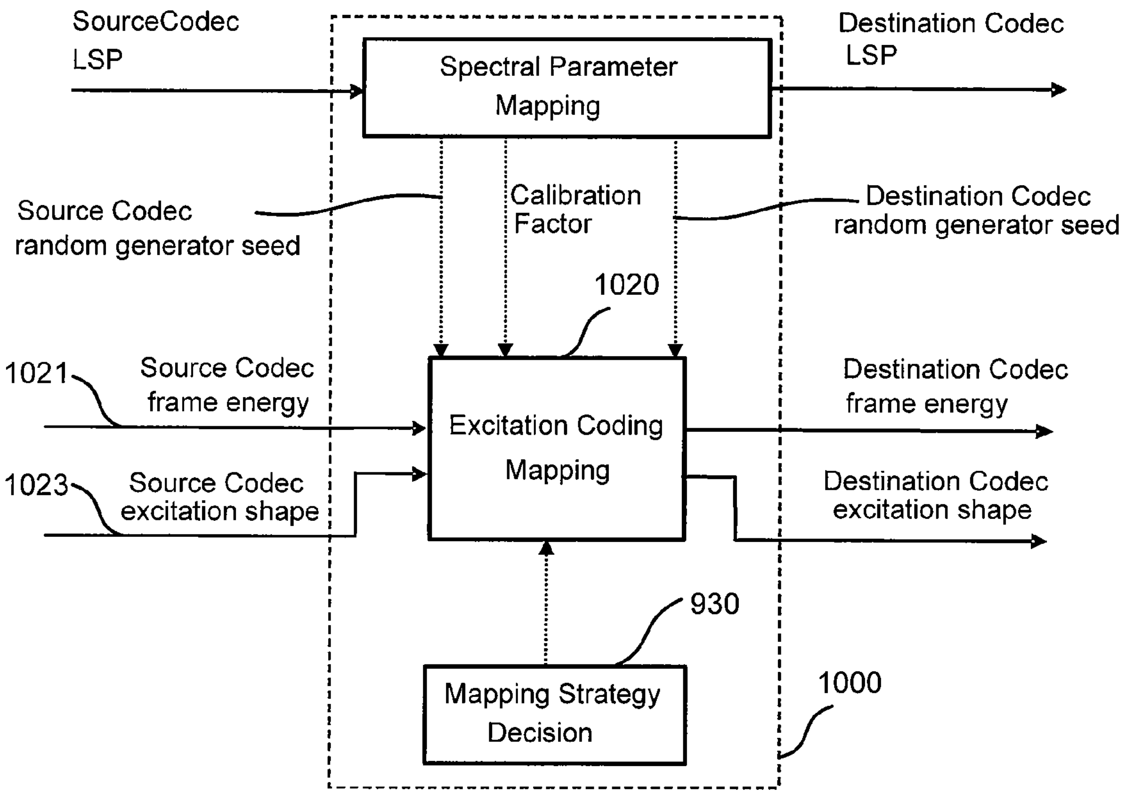
FIG. 10 is a simplified block diagram illustrating a first set of CELP parameters for a silence or noise-like frame being transformed to a second set of CELP parameters according to an embodiment of the present invention.

Each mapping module comprises a speech spectral parameter mapping unit 910, an excitation mapping unit 920, and a mapping strategy decision unit 930. The speech spectral parameter mapping unit 910 maps the spectral parameters, usually line spectral pairs (LSPs) or line spectral frequencies (LSFs), of the source codec 911, directly to the spectral parameters of the destination codec 912. A calibration factor 914 is calculated and used to calibrate the excitation to account for the differences in the quantised spectral parameters of the source and destination codec. The excitation mapping unit 920 takes CELP excitation parameters including pitch lag, adaptive codebook gain, fixed codebook gain and fixed codebook codevectors from the interpolator and maps these to encoded CELP excitation parameters according to the destination codec. FIG. 9 shows a mapping module which may be selected for mapping parameters of an active speech frame, e.g., mapping from Rate ½ or Rate 1 of EVRC to Rate ½ Rate 1 of SMV. In this case, the input parameters to the excitation coding mapping unit are the adaptive codebook lag 921, adaptive codebook gain 923, fixed codebook codevector 927 and fixed codebook gain 925 of the source codec. The output parameters to the excitation coding mapping unit are the adaptive codebook lag 922, adaptive codebook gain 924, fixed codebook codevector 928 and fixed codebook gain 926 in the format of the destination codec. FIG. 10 shows a mapping module 1000 which may be selected for mapping parameters of a silence or noise-like speech frame, e.g., mapping from Rate ⅛ of EVRC to Rate ¼ or Rate ⅛ of SMV. In this case, the input parameters to the excitation coding mapping unit 1020 are typically the frame energy or subframe energies 1021, and excitation shape 1023. Not all excitation parameters shown in the figures may be present for a given codec or bit rate.

Linked to the excitation coding mapping unit 920 is a mapping strategy decision unit 930, which controls the type of excitation mapping to be used. Several mapping approaches may be used, including those using direct mapping from source codec to destination codec without any further analysis or iterations, analysis in the excitation domain, analysis in the filtered excitation domain or a combination of these strategies, such as searching the adaptive codebook in the excitation space and fixed codebook in the filtered excitation space. The mapping strategy decision module determines which mapping strategy is to be applied. The decision may be based on available computational resources or minimum quality requirements and can change in a dynamic fashion.

Figure 11:
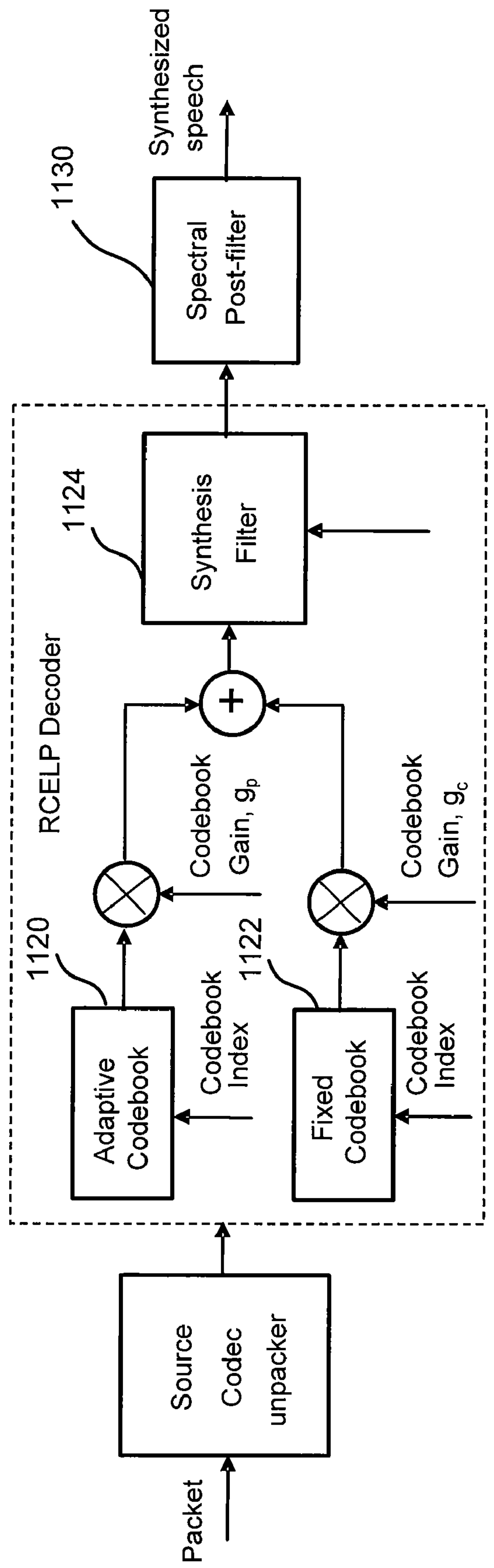
FIG. 11 is a simplified block diagram illustrating the decoding process performed in a RCELP-based voice decoder according to an embodiment of the present invention.
Figure 12:
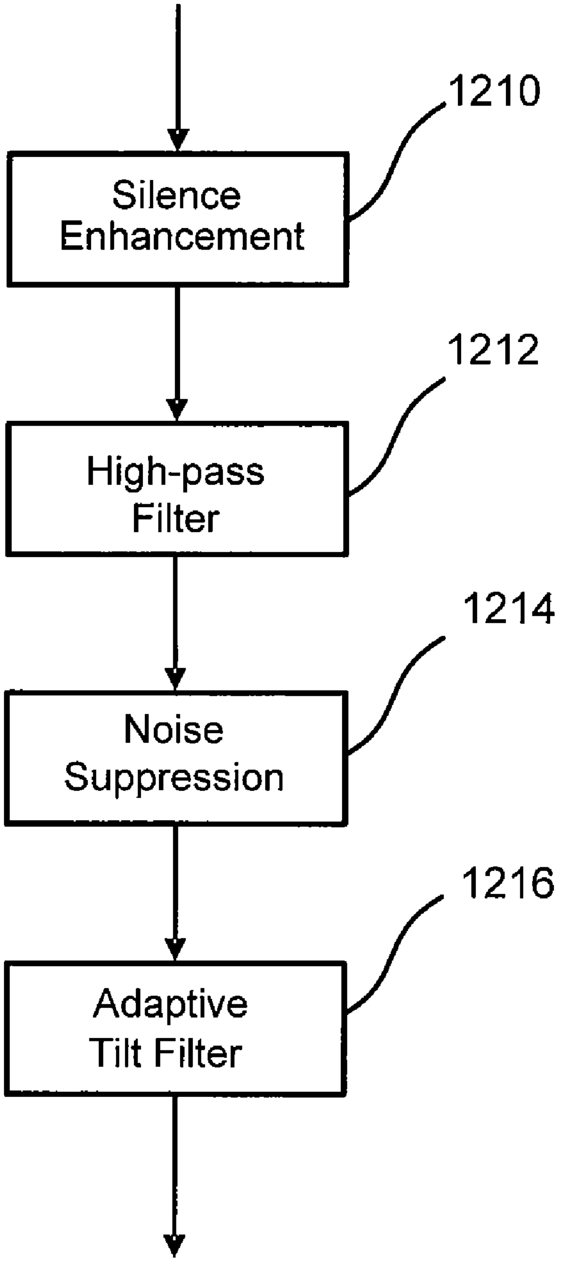
FIG. 12 illustrates the various stages of voice signal preprocessing in a variable rate voice encoder according to an embodiment of the present invention.

Except for the direct mapping strategy, in which parameters are directly mapped from source codec format to destination codec format without any analysis, the excitation signal is reconstructed. Reconstruction of the excitation during active speech requires the interpolated excitation parameters of pitch delays, adaptive codebook gains, fixed codebook shapes, and fixed codebook gains. During silence or noise, the parameters required are the signal energy, signal shape if available, and a random noise generator. FIG. 11 shows a block diagram the decoding process performed in a RCELP-based voice decoder. In this figure, the linear prediction (LP) excitation is formed by combining the gain-scaled contributions of the adaptive and fixed codebooks 1120, 1122 and then filtered by the speech synthesis filter 1124 and post-filter 1130. In the transcoder architecture of the present invention, to reduce complexity and quality degradations, the final source codec decoder operations of filtering the LP excitation signal by the synthesis filter to convert to the speech domain and then post-filtering to mask quantization noise are not used. Similarly, the pre-processing operations in the encoder of the destination codec are not used. An example of a speech pre-processor is shown in FIG. 12. High-pass filtering 1212 is a common pre-processing step in existing CELP-based voice codecs, with the advanced steps of silence enhancement 1210, noise suppression 1214 and adaptive tilt filtering 1216 being applied in more recent voice codecs. In the case where the source codec does not use noise suppression and the destination codec does use noise suppression, the transcoder architecture should provide noise suppression functionality.

Figure 13:
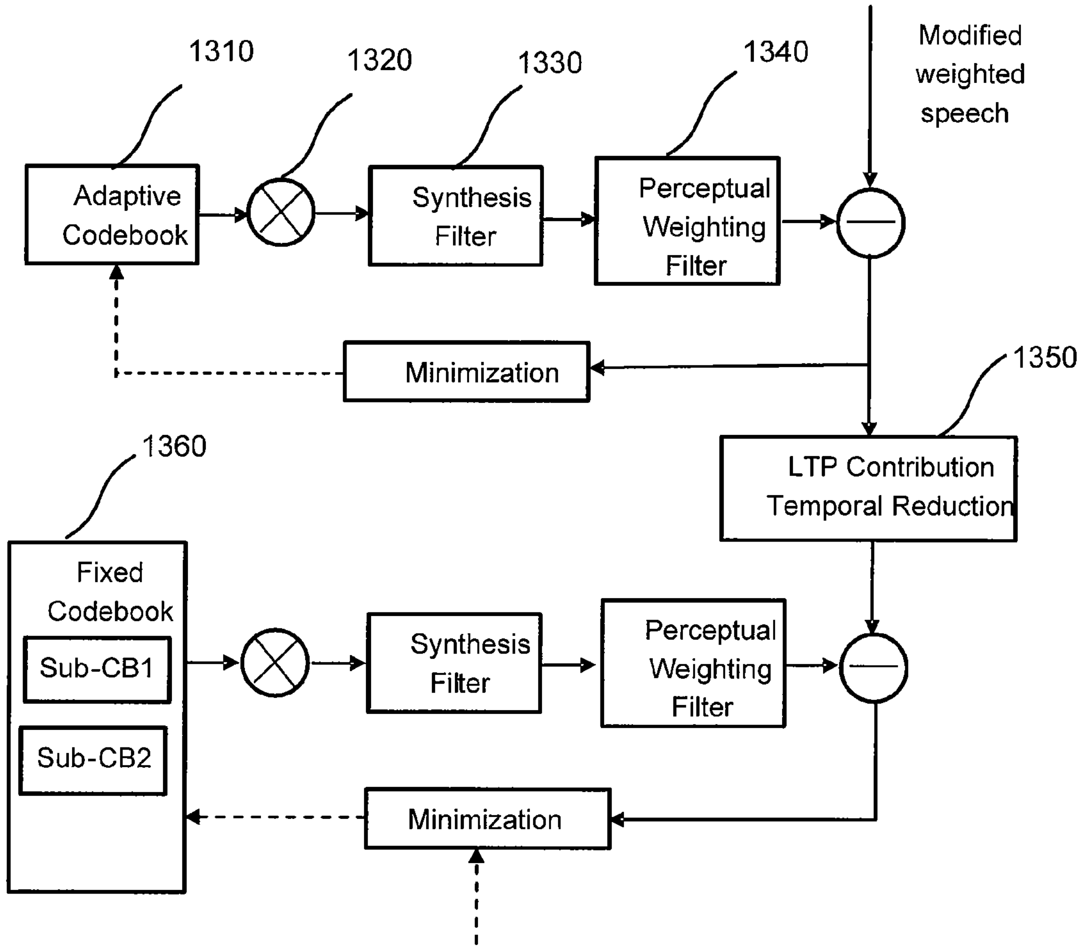
FIG. 13 is a simplified block diagram illustrating the subframe excitation encoding process performed in a RCELP-based voice encoder according to an embodiment of the present invention.
Figure 14:
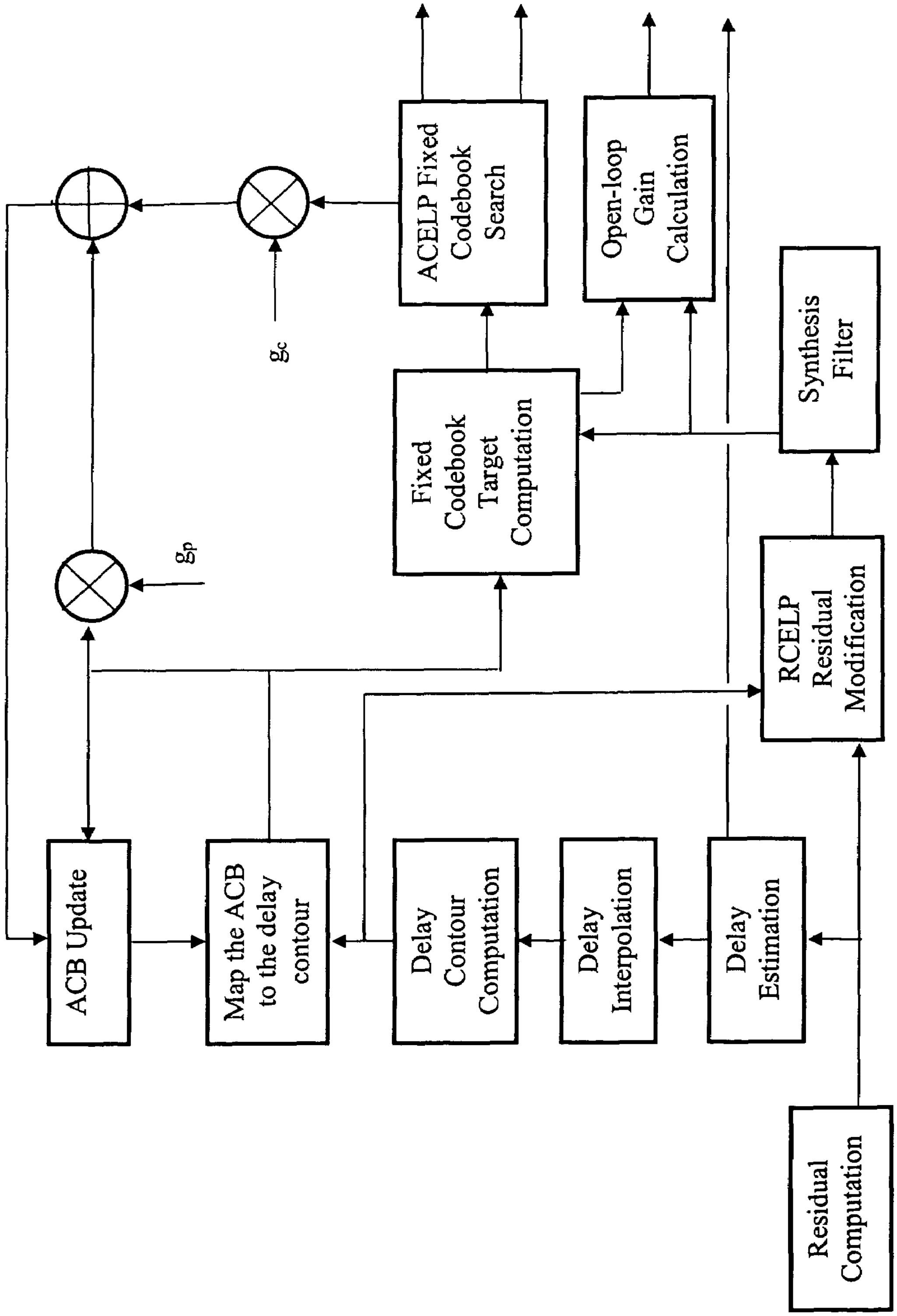
FIG. 14 is a simplified block diagram illustrating the subframe excitation encoding process performed in another RCELP-based voice encoder according to an embodiment of the present invention.

Current variable-rate voice codecs applicable to the present invention include EVRC and SMV which are based on the Relaxed CELP (RCELP) principle. Typical excitation quantization in RCELP codecs is performed by the technique shown in FIG. 13 and FIG. 14. In this case, the target signal is modified weighted speech 1302. The modification is performed to create a signal with a smooth interpolated pitch delay contour by time-warping or time-shifting pitch pulses. This allows for coarse pitch quantization. The adaptive codebook 1310 is mapped to the delay contour and then searched by gain-adjusting 1320 and filtering each candidate vector by the weighted synthesis filter 1330, 1340 and comparing the result to the target signal 1302. Once the best adaptive codebook vector is found, its contribution is subtracted from the target 1350, and the fixed codebook 1360 is searched in a similar manner. In the case where both source and destination codecs are based on the RCELP principle, the computationally expensive operation of detecting and shifting each pitch pulse in the encoder processing of the destination codec is not required. This is due to the fact that the reconstructed source excitation already follows the interpolated pitch track of the source codec. Hence, the target signal in the transcoder is not modified weighted speech, but simply the weighted speech, speech, weighted excitation, excitation, or calibrated excitation signal.

Figure 15:
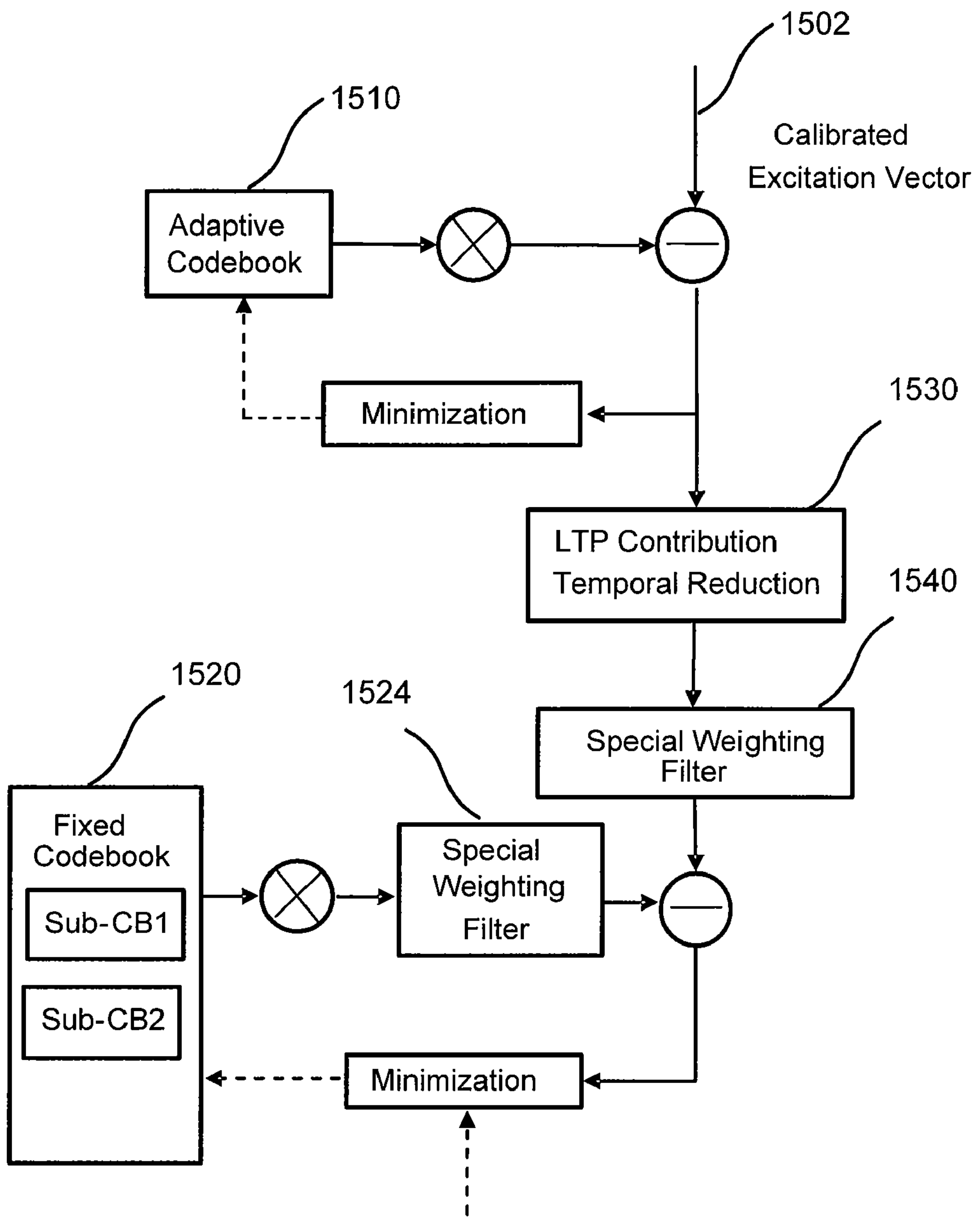
FIG. 15 is a simplified block diagram illustrating an embodiment of the subframe excitation transcoding process according to the present invention according to an embodiment of the present invention.
Figure 16:
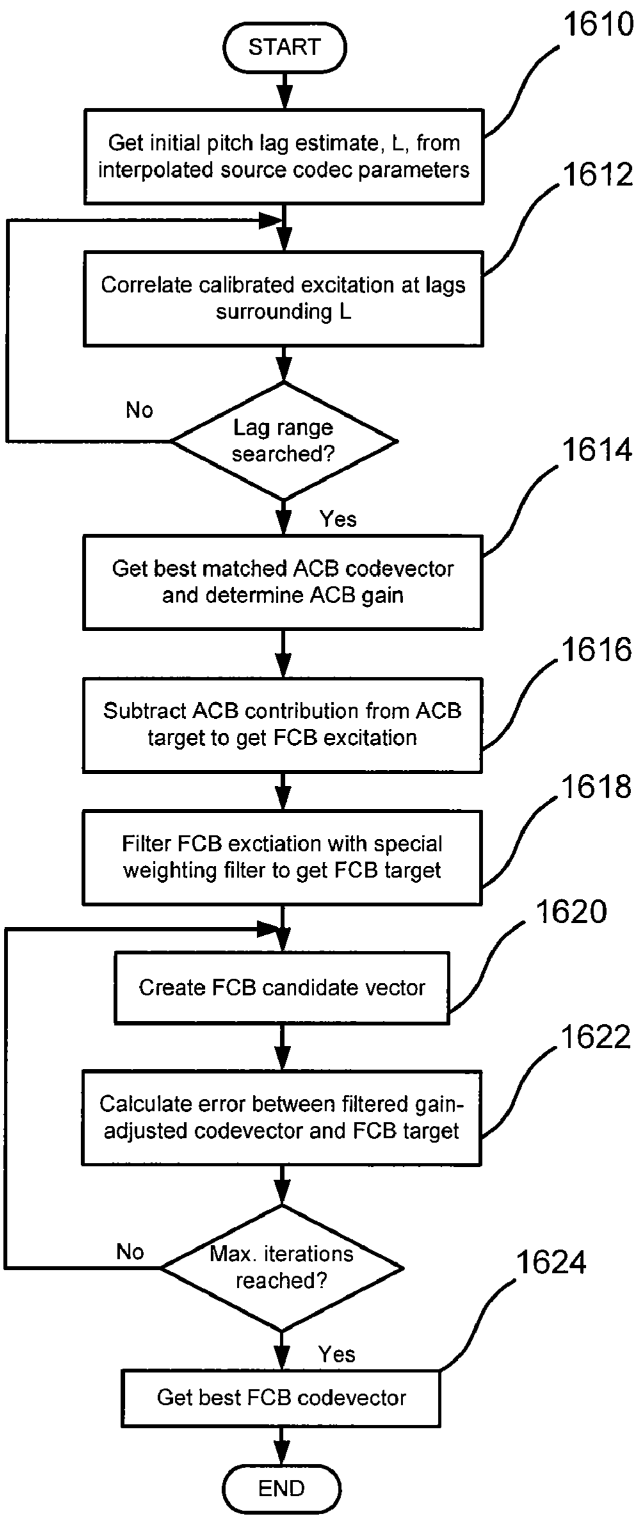
FIG. 16 is a simplified flowchart showing the steps of an embodiment of the subframe excitation transcoding process according to an embodiment of the present invention.

FIG. 15 shows a block diagram of an example of one mapping strategy of the transcoder between variable-rate voice codecs of the present invention. The procedure is outlined in FIG. 16. In this case, the mapping strategy chosen is a combination between analysis in the excitation domain and analysis in the filtered excitation domain. The target signal for the adaptive codebook search is the calibrated excitation signal 1502. The search of the adaptive codebook 1510 is performed in the excitation domain. This reduces complexity as each candidate codevector does not need to be filtered with the weighted synthesis filter before it can be compared to a speech domain target signal. The initial estimate of the pitch lag is the pitch lag obtained from the interpolation module that has been interpolated to match the subframe size of the destination codec 1610. The pitch is searched within a small interval of the initial pitch estimate 1612, at the accuracy (integer or fractional pitch) required by the destination codec. The adaptive codebook gain is then determined for the best codevector 1614 and the adaptive codevector contribution is removed from the calibrated excitation 1616. The result is filtered using a special weighting filter to produce the target signal for the fixed codebook search 1618. The fixed codebook is then searched, either by a fast technique or by gain-adjusting and filtering candidate codevectors by the special weighting filter and comparing the result with the target 1620, 1622, 1624. Fast search methods may be applied for both the adaptive and fixed codebook searches.

Another mapping strategy is to perform both the adaptive codebook and fixed codebook searches in the excitation domain. A further mapping strategy is to perform both the adaptive codebook and fixed codebook searches in the filtered excitation domain. Alternatively, parameters may be directly mapped from source to destination codec format without any searching. It is noted that any combinations of the above strategies may also be used. The best strategy in terms of both high quality and low complexity will depend on the source and destination codecs and bit rates.

A second-stage switching module 452 links the interpolation and mapping module to the destination bitstream packing module 440. The destination bitstream packing module 440 packs the destination CELP parameters in accordance with the destination codec standard. The parameters to be packed depend on the destination codec, the bit rate and frame type.

EVRC ⇔SMV TRANSCODING EXAMPLE

As an example, it is assumed that the source codec is the Enhanced Variable Rate Codec (EVRC) and the destination codec is the Selectable Mode Vocoder (SMV).

EVRC and SMV are both variable-rate codecs that determine the bit rate based on the characteristics of the input speech. These coders use Rate Set 1 of the Code Division Multiple Access communication standards IS-95 and cdma2000, which consists of the rates 8.55 kbit/s (Rate 1 or full Rate), 4.0 kbit/s (Rate ½ or half-rate), 2.0 kbit/s (Rate ¼ or quarter-rate) and 0.8 kbit/s (Rate ⅛ or eighth rate). EVRC uses Rate 1, Rate ½, and Rate ⅛; it does not use quarter-rate. SMV uses all four rates and also operates in one of six network controlled modes, Modes 0 to 6, which limits the bit rate during high traffic. Modes 4 and 5 are half-rate maximum modes. Depending on the mode of operation, different thresholds may be set to determine the rate usage percentages.

Figure 17:
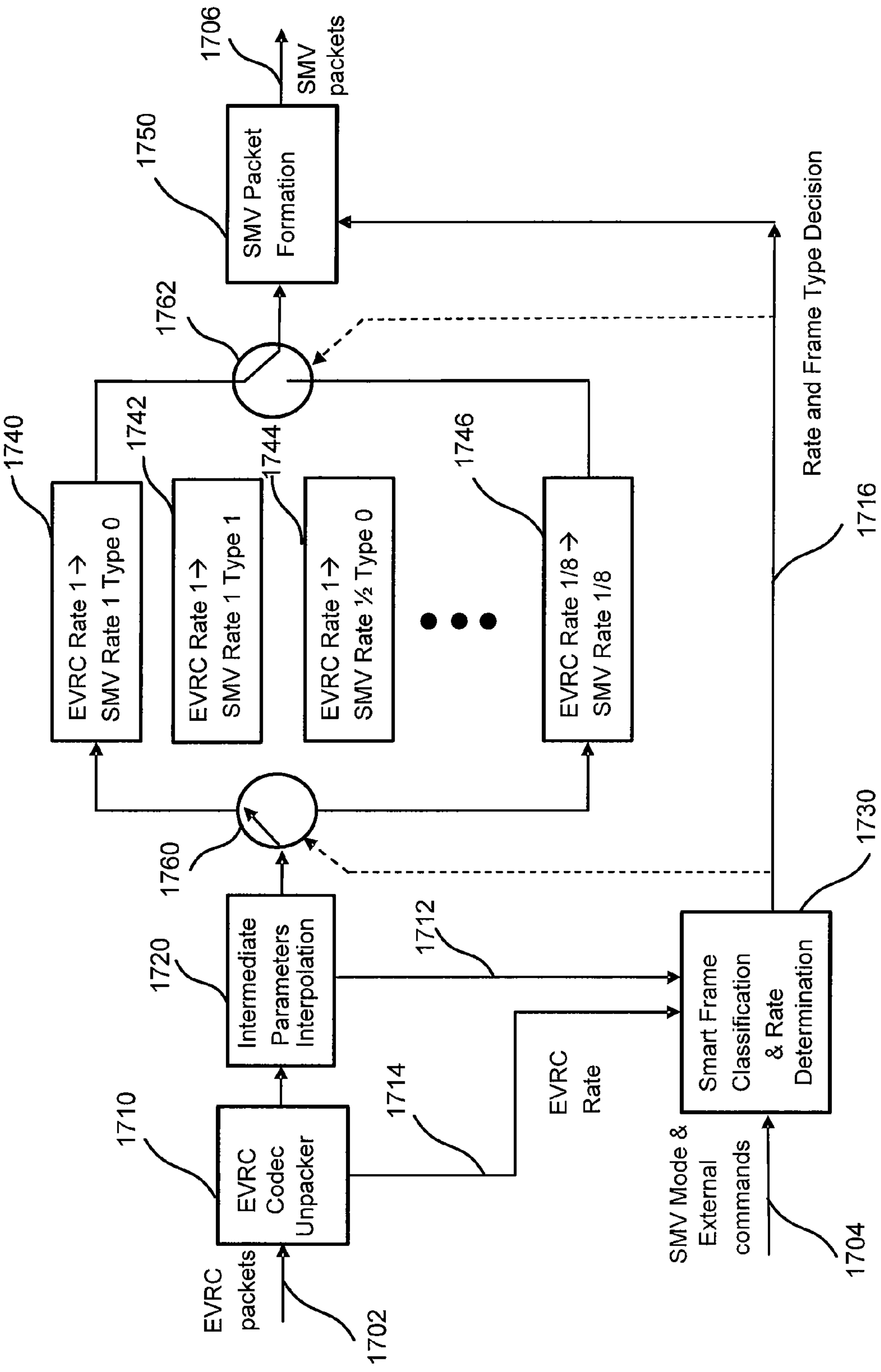
FIG. 17 is a simplified block diagram illustrating the voice transcoding procedure from EVRC to SMV according to an embodiment of the present invention.
Figure 18:
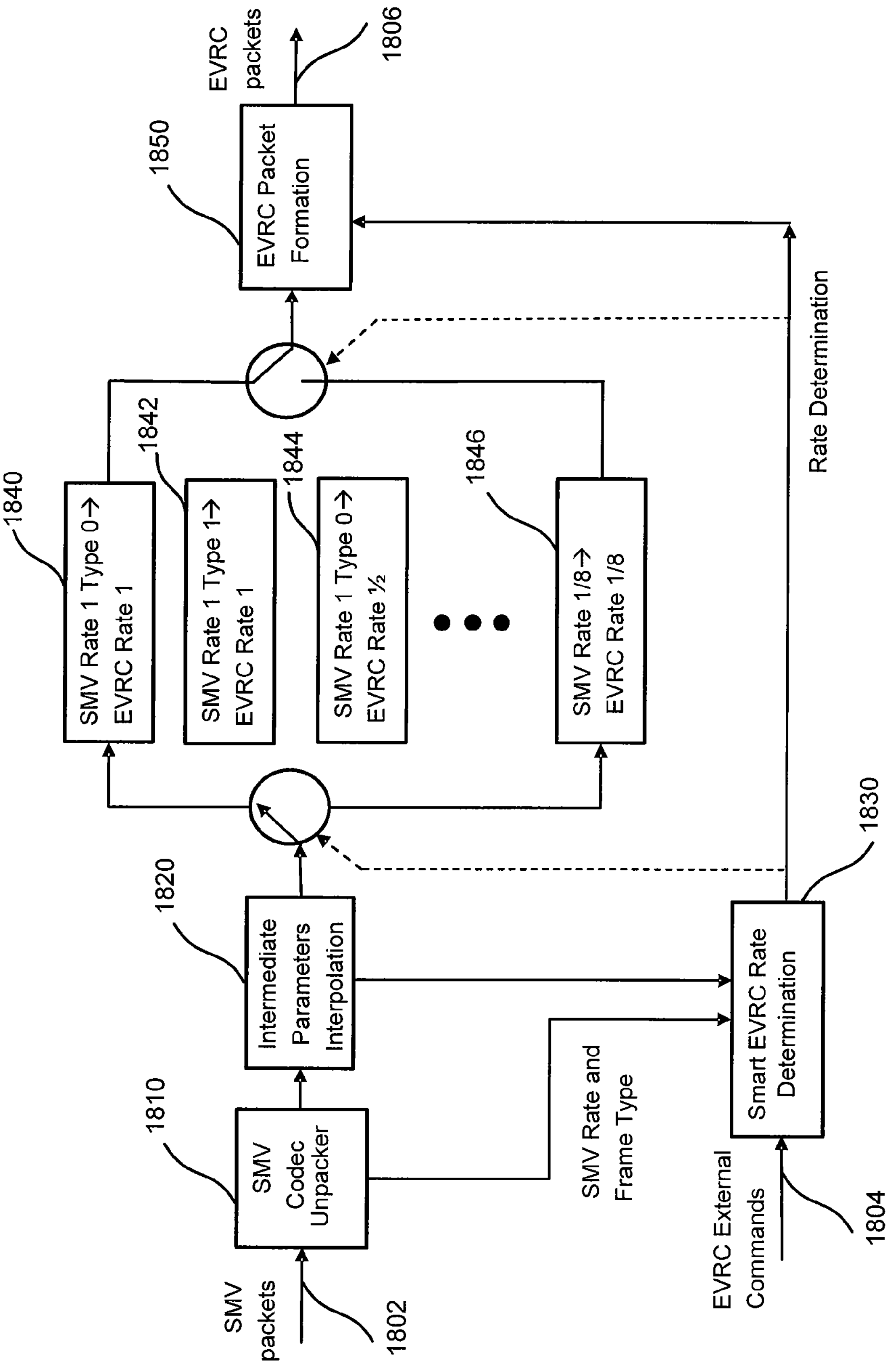
FIG. 18 is a simplified block diagram illustrating the voice transcoding procedure from SMV to EVRC according to an embodiment of the present invention.

A diagram of the apparatus for transcoding from EVRC to SMV is shown in FIG. 17. The apparatus comprises an EVRC unpacking module 1710, an intermediate parameters interpolation module 1720, a smart SMV frame classification and rate determination module 1730, several mapping modules 1740, 1742, 1744, 1746 to map parameters from all allowed rate and type transcoder transitions, and a SMV packet formation module 1750. The inputs to the apparatus are the EVRC frame packets 1702 and SMV external commands 1704 (e.g. network-controlled mode, half-rate max flag), and the outputs are the SMV frame packets 1706. Similarly, the apparatus for transcoding from SMV to EVRC is shown in FIG. 18. The apparatus comprises a SMV unpacking module 1810, an intermediate parameters interpolation module 1820, an EVRC rate determination module 1830, several mapping modules 1840, 1842, 1844, 1846 to map parameters from all allowed rate and type transcoder transitions, and an EVRC packet formation module 1850. The inputs to the apparatus are the SMV frame packets 1802 and EVRC external commands 1804 (e.g. half-rate max flag), and the outputs are the EVRC frame packets 1806.

In transcoding from EVRC to SMV, the bitstream representing frames of data encoded according to EVRC is unpacked by a bitstream unpacking module 1710. The actual parameters from the bitstream depend on the EVRC bit rate and include line spectral frequencies, spectral transition indicator, pitch delay, delta pitch delay, adaptive codebook gain, fixed codebook shapes, fixed codebook gains and frame energy. The unquantised parameters are passed to the intermediate parameters interpolation module 1720.

Figure 19:
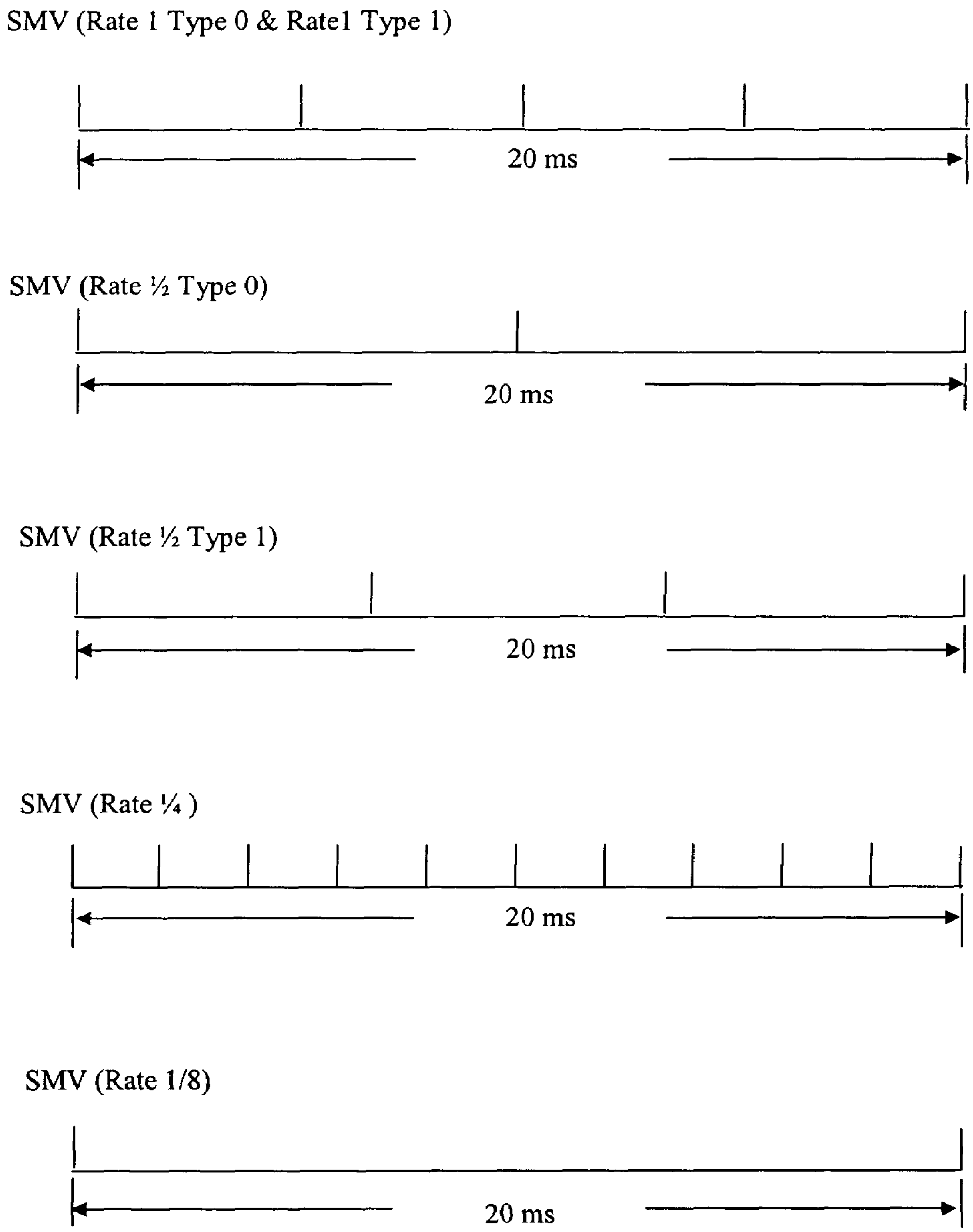
FIG. 19 is a simplified diagram illustrating the subframe size and frame size of different frame types and different rates in the SMV voice coder according to an embodiment of the present invention.
Figure 20:
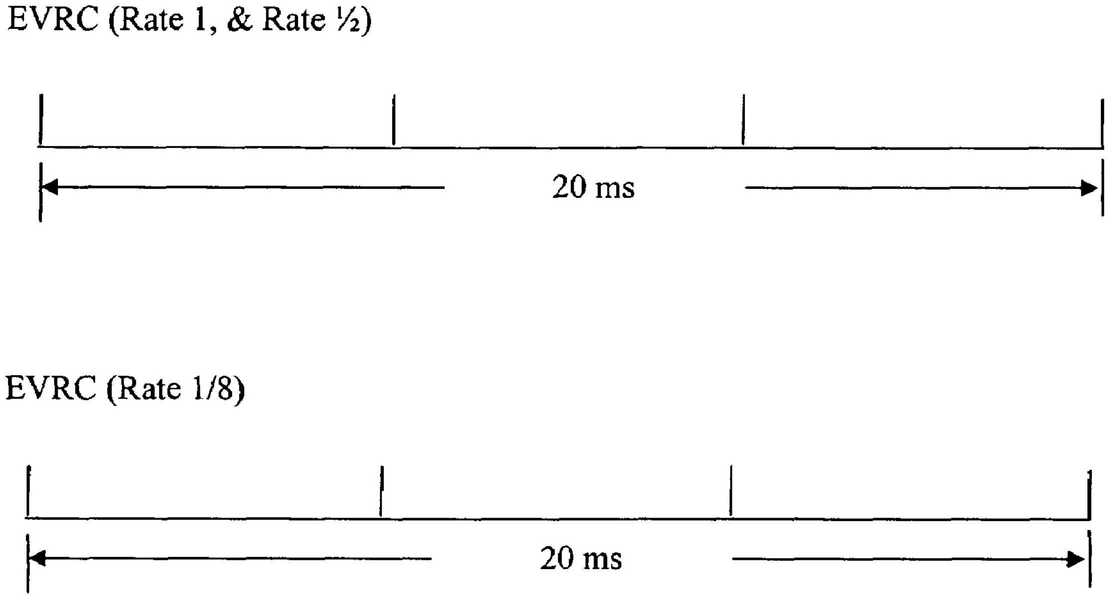
FIG. 20 is a simplified diagram illustrating the subframe size and frame size of different rates in the EVRC voice coder according to an embodiment of the present invention.

The intermediate parameter interpolation module 1720 interpolates between the different subframe sizes of EVRC and SMV. EVRC has 3 subframes per frame, whereas SMV has 1, 2, 3, 4, or 10 subframes per frame depending on the bit rate and frame type. Depending on the parameter and coding strategy, subframe interpolation may or may not be required. FIG. 19 and FIG. 20 illustrate the frame and subframe sizes for the different rates and frame types of SMV and EVRC respectively. Since the frame size of both codecs is 20 ms and the sampling rate of both codecs is 8 kHz, no frame size or sampling rate interpolation is required. The output interpolated parameters, or if no interpolation was carried out, the EVRC CELP parameters, are passed to the smart frame classification and rate determination module and the selected of the mapping module.

The frame classification and rate determination module 1730 receives the EVRC CELP parameters 1712, the EVRC bit rate 1714, the SMV network-controlled mode and any other SMV external commands 1704. The frame classification and rate determination module 1730 produces a frame class and rate decision 1716 for SMV based on these inputs. The frame classification and rate determination module 1730 comprises a classifier input parameter selector, for selecting which of the EVRC parameters will be used as inputs to the classification task, M sub-classifiers, buffers to store past input parameters and past output values and a final decision module. The sub-classifiers take as input the selected classification input parameters, the SMV network-controlled mode command, and past input and output values, and generate the frame class and rate decision. One sub-classifier may be used to determine the bit rate, and a second sub-classifier may be used to determine the frame class. The SMV frame class is either silence, noise-like, unvoiced, onset, non-stationary voiced or stationary voiced, and the SMV rate may be Rate 1, Rate ½, Rate ¼, or Rate ⅛. The SMV frame classification, using EVRC parameters, is performed according to a predefined configuration and classifier algorithm. The coefficients or rules of the classifier are determined during a prior EVRC-to-SMV classifier training or construction process. The frame classification and rate determination module includes a final decision module, that enforces all SMV rate transition rules to ensure illegal rate transitions are not allowed. For example, in SMV, a Rate 1 Type 1 cannot follow a Rate ⅛frame. This frame classification and rate determination module replaces the SMV standard classifier, which requires a large amount of processing to derive the parameters and features required for classification. The SMV frame-processing functions are shown in FIG. 7, and the many steps of the SMV classification procedure are shown in FIG. 8. These functions are not necessary in the present invention as the already available EVRC CELP parameters are used as inputs to classifier module.

The intermediate parameters interpolation module 1720 and the SMV smart frame classification and rate determination module 1730 are linked to one of many interpolation and mapping modules 1740, 1742, 1744, 1746 by a switching module 1760. EVRC has a single processing algorithm for each rate, whereas SMV has two possible processing algorithms for each of Rate 1 and Rate ½, and a single processing algorithm for each of Rate ¼ and Rate ⅛. The SMV frame type and bit rate 1716 determined by the frame classification and rate determination module control which interpolation and mapping module is to be chosen. For Rates 1 and ½ of SMV, the stationary voiced frame class uses subframe processing Type 1 and all other frame classes use subframe processing Type 0. As shown in FIG. 17, there are interpolation and mapping modules 1740, 1742, 1744, 1746 for each allowed EVRC rate and SMV type and rate combination. For example, interpolation and mapping modules include:

EVRC Rate 1 to SMV Rate 1 Type 0
EVRC Rate 1 to SMV Rate 1 Type 1
EVRC Rate ½ to SMV Rate 1 Type 0
EVRC Rate ½ to SMV Rate 1 Type 1
EVRC Rate ½ to SMV Rate ½ Type 0
EVRC Rate ½ to SMV Rate ½ Type 1
. . .

and so on.

For the EVRC-to-SMV transcoder, interpolation and mapping modules 1840, 1842, 1844, 1846 include:

SMV Rate 1 Type 0 to EVRC Rate 1
SMV Rate 1 Type 1 to EVRC Rate 1
SMV Rate 1 Type 0 to EVRC Rate ½
SMV Rate 1 Type 1 to EVRC Rate ½

SMV Rate ½ Type 0 to EVRC Rate ½

SMV Rate ½ Type 1 to EVRC Rate ½

. . .

and so on.

Each mapping module comprises a speech spectral parameter mapping unit 910, an excitation mapping unit 920, and a mapping strategy decision unit 930. The speech spectral parameter mapping unit 910 maps the EVRC line spectral frequencies directly to SMV line spectral frequencies. This occurs for all source EVRC bit rates. The parameters passed to the excitation mapping unit depend on the source EVRC bit rate. For EVRC Rates 1 and ½, the input CELP excitation parameters are the pitch lag, delta pitch lag (Rate 1 only), adaptive codebook gain, fixed codevectors, and fixed codebook gain. For EVRC Rate ⅛, typically inactive frames, the input excitation parameter is the frame energy. The excitation parameters are mapped to SMV excitation parameters, depending on the selected mapping module and mapping strategy. The mapping strategy decision module 930 controls the mapping strategy to be used. In this example, the mapping strategy for active speech is to perform analysis in the excitation domain.

Using the EVRC excitation parameters of pitch delay, delta pitch delay, adaptive codebook gain, fixed codevectors, fixed codebook gains and frame energy, the excitation signal is reconstructed. To reduce complexity and quality degradations, the EVRC decoder operations of filtering the excitation signal by the synthesis filter to convert to the speech domain and post-filtering are not used. Similarly, the pre-processing operations of SMV are not used. These include silence enhancement, high-pass filtering, noise suppression and adaptive tilt filtering. Since the EVRC encoder contains noise-suppression operations, the transcoder does not include further noise-suppression functions.

In RCELP-based coders like EVRC and SMV, a fundamental part of the signal processing is in the modification of the speech to match an interpolated pitch track. This saves quantisation bits required for pitch representation, but involves a large amount of computation as pitch pulses must be detected and individually shifted or time-warped. For the EVRC-to-SMV transcoding example, the signal modification functions within the SMV encoder may be bypassed. This is due to the fact that similar signal modification has already been performed in the EVRC encoder. Hence the reconstructed excitation signal already possesses a smooth pitch characteristic and is already in a form amenable to efficient quantization. The target signal for the adaptive codebook search is thus the excitation signal, without pitch modifications, that has been calibrated to account for differences between the quantized EVRC LSFs and the quantized SMV LSFs.

Mapping of excitation parameters is performed as described in the previous section. Simplifications can be made to the fixed codebook search, as SMV contains multiple sub-codebooks for each rate and frame type. Since the EVRC bit rate, fixed codevector and fixed codebook structure are known, it may not be necessary to search all sub-codebooks to best match target excitation. Instead, each mapping module may contain a single fixed sub-codebook or a subset of the fixed sub-codebooks to reduce computational complexity.

A second-stage switching module 1762 links the interpolation and mapping module to the SMV bitstream packing module 1750. The bitstream is packed according to the SMV frame type and bit rate 1716. One SMV output frame is produced for each EVRC input frame.

OTHER CELP TRANSCODERS

The invention of method and apparatus for voice transcoding between variable rate coders described in this document is generic to all linear prediction-based voice codecs, and applies to any voice transcoders between the existing codecs G.723.1, GSM-AMR, EVRC, G.728, G.729, G.729A, QCELP, MPEG-4 CELP, SMV, AMR-WB, VMR and all other future voice codecs. The invention applies especially to those transcoders, in which the destination coder makes use of rate determination and/or frame classification information.

The previous description of the preferred embodiment is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for transcoding a source codec bitstream in a source codec format to a destination variable-rate codec bitstream in a destination variable-rate codec format, the method comprising:

unpacking the source codec bitstream to at least one or more source voice parameters;

interpolating the one or more source voice parameters to one or more interpolated voice parameters if a difference exists between at least one of a source frame size and a destination frame size or a source subframe size and a destination subframe size or a source sampling rate and a destination sampling rate;

classifying a frame class based upon the one or more source voice parameters or the one or more interpolated voice parameters, wherein the frame class is selected from three or more frame classes, wherein classifying the frame class comprises:

selecting one or more voice parameters from the one or more source voice parameters or the one or more interpolated voice parameters;

using a previously stored state information;

performing frame classification to produce the frame class;

outputting the frame class; and updating the previously stored state information for use in classifying one or more future frames;

determining a rate from at least one of the one or more source voice parameters, the one or more interpolated voice parameters, the frame class, and one or more external control commands, wherein the rate is selected from three or more rates associated with the destination variable-rate codec format;

mapping the one or more source voice parameters or the one or more interpolated voice parameters to one or more mapped voice parameters; and packing the one or more mapped voice parameters into the destination variable-rate codec bitstream.

2. The method of claim 1 wherein frame classification uses one or more pre-defined coefficients.

3. The method of claim 1, wherein mapping comprises:

selecting one of a plurality of voice codec mapping strategies;

mapping one or more source LSP coefficients or one or more interpolated LSP coefficients to one or more destination LSP coefficients;

quantizing the one or more destination LSP coefficients;

mapping one or more source excitation parameters or one or more interpolated excitation parameters to one or more destination excitation parameters; and quantizing the one or more destination excitation parameters.

4. The method of claim 1 wherein the destination variable-rate codec is EVRC.

5. The method of claim 1 wherein the destination variable-rate codec is SMV.

6. The method of claim 1 wherein the destination variable-rate codec is a Relaxed CELP voice codec.

7. The method of claim 1 wherein the source codec and the destination variable-rate codec are within a single standard but are different modes.

8. The method of claim 1 wherein the three or more frame classes are silence, unvoiced, onset, plosive, non-stationary voiced, and stationary voiced speech.

9. The method of claim 1 wherein classifying a frame is performed without reconstructing a speech signal.

10. The method of claim 1 wherein the previously stored state information comprises one or more source frame rates, one or more destination frame classes and one or more destination frame rates.

11. A method for transcoding a source codec bitstream in a source codec format to a destination variable-rate codec bitstream in a destination variable-rate codec format, the method comprising:

unpacking the source codec bitstream to at least one or more source voice parameters;

interpolating the one or more source voice parameters to one or more interpolated voice parameters if a difference exists between at least one of a source frame size and a destination frame size or a source subframe size and a destination subframe size or a source sampling rate and a destination sampling rate;

classifying a frame class based upon the one or more source voice parameters or the one or more interpolated voice parameters, wherein the frame class is selected from three or more frame classes;

determining a rate from at least one of the one or more source voice parameters, the one or more interpolated voice parameters, the frame class, and one or more external control commands, wherein the rate is selected from three or more rates associated with the destination variable-rate codec format, wherein determining the rate comprises:

selecting one or more voice parameters from the one or more source voice parameters or the one or more interpolated voice parameters and a source frame rate associated with the source codec bitstream;

using the frame class;

using the one or more external control commands;

using a previously stored state information;

performing rate determination to produce the rate;

outputting the rate; and updating the previously stored state information for use in determining one or more rates for one or more future frames;

mapping the one or more source voice parameters or the one or more interpolated voice parameters to one or more mapped voice parameters; and packing the one or more mapped voice parameters into the destination variable-rate codec bitstream.

12. The method of claim 11 wherein rate determination uses one or more pre-defined coefficients.

13. The method of claim 11 wherein the three or more rates comprise a full rate, a half rate and an eighth rate.

14. The method of claim 11 wherein the previously stored state information comprises one or more source frame rates, one or more destination frame classes and one or more destination frame rates.

15. The method of claim 11 wherein the rate is determined from the frame class.

16. The method of claim 11 wherein mapping comprises:

selecting one of a plurality of voice codec mapping strategies;

mapping one or more source LSP coefficients or one or more interpolated LSP coefficients to one or more destination LSP coefficients;

quantizing the one or more destination LSP coefficients;

mapping one or more source excitation parameters or one or more interpolated excitation parameters to one or more destination excitation parameters; and quantizing the one or more destination excitation parameters.

17. A method for transcoding a source codec bitstream in a source codec format to a destination variable-rate codec bitstream in a destination variable-rate codec format, the method comprising:

unpacking the source codec bitstream to at least one or more source voice parameters;

interpolating the one or more source voice parameters to one or more interpolated voice parameters if a difference exists between at least one of a source frame size and a destination frame size or a source subframe size and a destination subframe size or a source sampling rate and a destination sampling rate;

classifying a frame class based upon the one or more source voice parameters or the one or more interpolated voice parameters, wherein the frame class is selected from three or more frame classes;

determining a rate from at least one of the one or more source voice parameters, the one or more interpolated voice parameters, the frame class, and one or more external control commands, wherein the rate is selected from three or more rates associated with the destination variable-rate codec format;

mapping the one or more source voice parameters or the one or more interpolated voice parameters to one or more mapped voice parameters, wherein mapping further comprises:

selecting one of a plurality of voice codec mapping strategies;

mapping one or more source LSP coefficients or one or more interpolated LSP coefficients to one or more destination LSP coefficients;

quantizing the one or more destination LSP coefficients;

mapping one or more source excitation parameters or one or more interpolated excitation parameters to one or more destination excitation parameters;

quantizing the one or more destination excitation parameters, reconstructing an excitation signal from the one or more source excitation parameters or the one or more interpolated excitation parameters;

filtering the excitation signal with a calibration factor to produce a calibrated excitation signal; and processing the calibrated excitation signal to produce the one or more destination excitation parameters;

packing the one or more mapped voice parameters into the destination variable-rate codec bitstream.

18. The method of claim 17 wherein the plurality of voice code mapping strategies include at least one of:

a direct space mapping of voice parameters;

a mapping using analysis in excitation space;

a mapping using analysis in filtered excitation space; and a mapping using a combination of two or more voice codec mapping strategies.

19. The method of claim 18 wherein the mapping using analysis in excitation space is performed without using a signal in a speech signal domain.

20. The method of claim 17 wherein reconstructing the excitation signal does not include a process of modifying the excitation signal to match an interpolated delay contour.

21. The method of claim 17 wherein the mapping using a combination of two or more voice codec mapping strategies is a mapping using a combination of analysis in excitation space and analysis in filtered excitation space.

22. A method for transcoding a source codec bitstream in a source codec format to a destination variable-rate codec bitstream in a destination variable-rate codec format, the method comprising:

unpacking the source codec bitstream to at least one or more source voice parameters;

interpolating the one or more source voice parameters to one or more interpolated voice parameters if a difference exists between at least one of a source frame size and a destination frame size or a source subframe size and a destination subframe size or a source sampling rate and a destination sampling rate;

classifying a frame class based upon the one or more source voice parameters or the one or more interpolated voice parameters, wherein the frame class is selected from three or more frame classes;

determining a rate from at least one of the one or more source voice parameters, the one or more interpolated voice parameters, the frame class, and one or more external control commands, wherein the rate is selected from three or more rates associated with the destination variable-rate codec format;

mapping the one or more source voice parameters or the one or more interpolated voice parameters to one or more mapped voice parameters, wherein the mapping comprises selecting a mapping path from three or more mapping paths, wherein selecting a mapping path uses at least a source frame rate, the rate and the one or more external commands; and packing the one or more mapped voice parameters into the destination variable-rate codec bitstream.

23. The method of claim 22 wherein the one or more external commands comprise one of a mode selected from six SMV modes or an EVRC external rate command.

24. A method for transcoding a source codec bitstream in a source codec format to a destination variable-rate codec bitstream in a destination variable-rate codec format, the method comprising:

unpacking the source codec bitstream to at least one or more source voice parameters;

interpolating the one or more source voice parameters to one or more interpolated voice parameters if a difference exists between at least one of a source frame size and a destination frame size or a source subframe size and a destination subframe size or a source sampling rate and a destination sampling rate;

classifying a frame class based upon the one or more source voice parameters or the one or more interpolated voice parameters, wherein the frame class is selected from three or more frame classes;

determining a rate from at least one of the one or more source voice parameters, the one or more interpolated voice parameters, the frame class, and one or more external control commands, wherein the rate is selected from three or more rates associated with the destination variable-rate codec format;

mapping the one or more source voice parameters or the one or more interpolated voice parameters to one or more mapped voice parameters, wherein mapping comprises selecting a mapping path from three or more mapping paths, wherein selecting a mapping path uses at least one or more of a source frame rate and a source SMV frame type; and packing the one or more mapped voice parameters into the destination variable-rate codec bitstream.

* * * * *